US010802623B2

(12) United States Patent
Choi et al.

(10) Patent No.: US 10,802,623 B2
(45) Date of Patent: Oct. 13, 2020

(54) ELECTRONIC DEVICE AND SCREEN DISPLAY METHOD THEREOF

(71) Applicant: Samsung Electronics Co., Ltd., Suwon-si (KR)

(72) Inventors: Hyun-mook Choi, Seoul (KR); Chun-woo Park, Suwon-si (KR); Min-jae Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 15/637,388

(22) Filed: Jun. 29, 2017

(65) Prior Publication Data

US 2018/0011578 A1 Jan. 11, 2018

(30) Foreign Application Priority Data

Jul. 5, 2016 (KR) .................. 10-2016-0084983

(51) Int. Cl.
*G06F 3/041* (2006.01)
*G06F 3/0488* (2013.01)
(Continued)

(52) U.S. Cl.
CPC ......... *G06F 3/0412* (2013.01); *G02B 27/017* (2013.01); *G02B 27/0172* (2013.01);
(Continued)

(58) Field of Classification Search
CPC ........ G06F 3/0412; G06F 3/012; G06F 3/041; G06F 3/04817; G06F 3/038; G06F 3/04883; G06F 3/03545; G06F 3/0488; G06F 3/04886; G06F 3/1454; G02B 27/017; G02B 27/0172; G09G 3/003; H04M 1/0266; H04M 1/172563; H04M 1/2477
(Continued)

(56) References Cited

U.S. PATENT DOCUMENTS 8,482,527 B1 7/2013 Kim
8,502,864 B1 * 8/2013 Watkins ............. G03B 35/00
348/52

(Continued)

FOREIGN PATENT DOCUMENTS

JP 2009-42967 2/2009
KR 10-2015-0054825 5/2015
KR 10-2016-0051384 5/2016

OTHER PUBLICATIONS

International Search Report dated Oct. 17, 2017 in corresponding International Patent Application No. PCT/KR2017/006827.
(Continued)

*Primary Examiner* — Fred Tzeng
(74) *Attorney, Agent, or Firm* — Staas & Halsey LLP (57) ABSTRACT

An electronic device includes a communicator configured to perform communication with an external device, a display configured to display a UI (User Interface) element in a screen, and a processor. The processor receives through the communicator, touch panel information of the external device and first data according to a first input of a user detected on the touch panel of the external device, and changes a location of the UI element displayed on the screen based on the touch panel information and the first data.

19 Claims, 10 Drawing Sheets

(51) Int. Cl.
  *G09G 3/20* (2006.01)
  *G06F 3/038* (2013.01)
  *G06F 3/0354* (2013.01)
  *G02B 27/01* (2006.01)
  *G06F 3/01* (2006.01)
  *G09G 3/00* (2006.01)
  *H04M 1/02* (2006.01)
  *A63F 13/214* (2014.01)

(52) U.S. Cl.
  CPC .............. *G06F 3/012* (2013.01); *G06F 3/038* (2013.01); *G06F 3/03547* (2013.01); *G06F 3/041* (2013.01); *G06F 3/0488* (2013.01); *G09G 3/003* (2013.01); *G09G 3/20* (2013.01); *H04M 1/0266* (2013.01); *A63F 13/214* (2014.09); *A63F 2300/302* (2013.01); *A63F 2300/8082* (2013.01); *G02B 2027/014* (2013.01); *G09G 2354/00* (2013.01)

(58) Field of Classification Search
  USPC .......................................................... 345/173
  See application file for complete search history.

(56) References Cited

U.S. PATENT DOCUMENTS

| | | | |
|---|---|---|---|
| 9,182,884 B2* | 11/2015 | Westerman | G06F 3/04817 |
| 9,378,592 B2 | 6/2016 | Kim et al. | |
| 9,448,624 B2 | 9/2016 | Kim | |
| 9,772,744 B2* | 9/2017 | Yamano | G06F 3/04886 |
| 9,933,620 B2* | 4/2018 | Van Heugten | G02C 7/04 |
| 2008/0127065 A1* | 5/2008 | Bryant | G05B 19/056 |
| | | | 717/109 |
| 2008/0309632 A1* | 12/2008 | Westerman | G06F 3/038 |
| | | | 345/173 |
| 2009/0313659 A1* | 12/2009 | Samuels | G08B 13/19656 |
| | | | 725/78 |
| 2011/0285704 A1* | 11/2011 | Takeda | A63F 13/525 |
| | | | 345/419 |
| 2012/0026166 A1* | 2/2012 | Takeda | A63F 13/211 |
| | | | 345/419 |
| 2014/0078043 A1 | 3/2014 | Kim | |
| 2014/0078176 A1 | 3/2014 | Kim et al. | |
| 2014/0139439 A1 | 5/2014 | Park | |
| 2014/0347326 A1* | 11/2014 | Yim | H04M 1/2477 |
| | | | 345/179 |
| 2014/0354852 A1* | 12/2014 | Won | H04N 5/2628 |
| | | | 348/239 |
| 2014/0359493 A1* | 12/2014 | Hong | G06F 3/1454 |
| | | | 715/761 |
| 2014/0370873 A1* | 12/2014 | Yun | H04M 1/72563 |
| | | | 455/418 |
| 2015/0015508 A1* | 1/2015 | Song | G06F 3/04886 |
| | | | 345/173 |
| 2015/0015550 A1* | 1/2015 | Seong | G06F 3/03545 |
| | | | 345/179 |
| 2015/0106706 A1* | 4/2015 | Jeong | G06F 17/212 |
| | | | 715/274 |
| 2015/0220171 A1* | 8/2015 | Cho | G06F 3/041 |
| | | | 345/173 |
| 2015/0352437 A1 | 12/2015 | Koseki et al. | |
| 2016/0004406 A1* | 1/2016 | Kang | G06F 3/0488 |
| | | | 715/771 |
| 2016/0127624 A1 | 5/2016 | Woo et al. | |
| 2016/0306543 A1* | 10/2016 | Bang | G06F 3/04883 |
| 2017/0336944 A1* | 11/2017 | Liu | G06F 3/04817 |

OTHER PUBLICATIONS

Written Opinion of the International Searching Authority dated Oct. 17, 2017 in corresponding International Patent Application No. PCT/KR2017/006827.

* cited by examiner

//ELECTRONIC DEVICE AND SCREEN DISPLAY METHOD THEREOF

CROSS-REFERENCE TO RELATED APPLICATIONS

This application claims priority from Korean Patent Application No. 10-2016-0084983, filed on Jul. 5, 2016 in the Korean Intellectual Property Office, the disclosure of which is incorporated herein by reference in its entirety.

BACKGROUND

Field

Aspects of the exemplary embodiments relate to a screen display method of an electronic device, and more particularly, to a method displaying a screen by adjusting a location of a UI element displayed on a screen according to a location of a touch input of a user for a head mounted electronic device.

Description of the Prior Art

A head mounted electronic device is mounted on a user's head and displays a large screen or a stereoscopic image in front of the user (e.g., eyes of a user). The head mounted electronic device may be used as a virtual reality (VR) device or an augmented reality (AR) device. In order to manipulate the head mounted electronic device (hereinafter, referred to as an electronic device), an additional input device may be needed.

SUMMARY

When the electronic device is mounted on a user's head, it blocks the user's view. Thus, if the user tries to select a UI element displayed on a screen of the electronic device through a touch panel of an external device while wearing the electronic device, it is difficult for the user to select the UI element displayed on the screen of the electronic device because the user performs a touch input without seeing the touch panel with the user's own eyes.

An aspect of the exemplary embodiment has been made to provide an electronic device which enables a user to select a UI element exactly by adjusting a location of the UI element and displaying the UI element displayed on a screen of the electronic device based on touch panel information and a user's input freely touching the touch panel.

According to an exemplary embodiment, there is provided an electronic device including a communicator configured to perform communication with an external device, a display configured to display a UI element in a screen, and a processor, and the processor may receive through the communicator, touch panel information of the external device and a first data according to a first input of a user detected on the touch panel of the external device, and change a location of the UI element displayed on the screen based on the touch panel information and the first data. Here, the first input may be a hovering. The first data may be coordinates of the hovering point.

The processor may receive a second data according to a second input of a user detected on the touch panel of the external device, and select a UI element displayed on the screen of the electronic device based on the second data.

The second data may be received after the first data is received.

The processor may output a message inducing a change of a touch location on the touch panel based on the touch panel information and the first data.

The message may be output differently according to the coordinates of the first input point. The message may be output as a voice.

The message may be displayed on the screen.

The processor may output a graphic object inducing a change of a touch input location on the touch panel based on the touch panel information and the first data.

According to an another exemplary embodiment, there is provided a screen display method of an electronic device including displaying a UI element on a screen, receiving the touch panel information of the external device and the first data according to the first input of the user detected on the touch panel from the external device through the communicator, and changing the location of the UI element displayed on the screen based on the touch panel information and the first data.

The first input may be a hovering.

The first data may be coordinates of the hovering point.

The method may further include receiving the second data according to the second input of the user detected on the touch panel, and selecting the UI element displayed on the screen of the electronic device based on the second data.

The second data may be received after the first data is received.

The method may output the message inducing the change of the touch location on the touch panel based on the touch panel information and the first data.

The message may be output differently according to the coordinates of the first input point.

The message may be output as a voice. The message may be displayed on the screen.

The method may include outputting the graphic object inducing the change of the touch input location on the touch panel based on the touch panel information and the first data.

According to an exemplary embodiment, there is provided an electronic device including a communicator configured to perform communication with an external device, a display configured to display a screen, and a processor, and the processor may receive through the communicator, touch panel information of the external device and a first data according to a first touch of a user detected on the touch panel of the external device, and adjust a location of the UI element displayed on the screen based on the touch panel information and the first data. According to the above, even though a user may not see an external device while the user is wearing the electronic device so the user's view is being blocked, the user may touch an area exactly where the user wishes to touch because the electronic device adjusts a location of the UI element displayed on a screen by using information regarding the area where the user is going to touch.

According to an exemplary embodiment there is provided a method including receiving a touch position of a touch on a touch input device; and adjusting position of a user interface element displayed on a display responsive to the touch position, the display being separate from the touch input device.

Resolution sizes of the touch input device and display may be correlated where a user interface element position is positioned proportionally to the touch position.

The touch may be one of a finger touch, a stylus touch, a gesture and a hover.

The user interface element may be one of a graphic object and a text message.

The graphic object may provide a visual guide to movement of the touch.

The display may be a head mounted display.

The touch input device may be one of a touch panel, a smart phone, a tablet and a table top computer.

The touch position may be wirelessly received by the display from the touch input device.

According to an exemplary embodiment there is provided a method including receiving a touch position of a touch on a touch input device; and providing instructions, responsive to the touch, for moving the touch to an adjusted touch position corresponding to a user interface element position as displayed on a display, the display being separate from the touch input device.

The instructions may be one of a voice message and a text message.

The instructions may be one of a graphic object and a text message.

The graphic object may provide a visual guide to movement of the touch.

The methods may be stored on a non-transitory computer readable storage.

DETAILED DESCRIPTION

Exemplary embodiments are described in greater detail below with reference to the accompanying drawings. However, this does not necessarily limit the scope of the exemplary embodiments to a specific embodiment form. Instead, modifications, equivalents and replacements included in the disclosed concept and technical scope of this exemplary embodiment may be employed. In relation to explanation of the drawings, similar drawing reference numerals may be used for similar constituent elements. Unless otherwise defined specifically, a singular expression may encompass a plural expression. In the description, the term "A or B" or "at least one of A or/and B" may include all possible combinations of the items that are enumerated together. The expression "1", "2", "first", or "second" as used herein may modify a variety of elements, irrespective of order and/or importance thereof, and only to distinguish one element from another. Accordingly, without limiting the corresponding elements. It will be understood that when an element (for example, a first) is "(operatively or communicatively) coupled with/to" or "connected with" another element (for example, a second), the element may be directly coupled with/to another element, and there may be an intervening element (for example, a third element) between the element and another element.

In the description, the term "configured to" may be interchanged with, for example, "suitable for", "having the capacity to", "designed to", "adapted to", "made to", or "capable of" under certain circumstances. Under certain circumstances, the term "device configured to" may refer to "device capable of" doing something together with another device or elements. For example, the phrase "processor configured to perform A, B, and C" may denote or refer to a dedicated processor (e.g., embedded processor) for performing the corresponding operations or a generic-purpose processor (e.g., CPU or application processor) that can perform the corresponding operations through execution of one or more software programs stored in a memory device.

An electronic device according to an exemplary embodiment may be a smart phone, for example.

In the description, a "user" may be a person manipulating an electronic device. In addition, the "user" may designate an apparatus performing a manipulation of the electronic device (e.g., an artificial intelligence electronic apparatus or a robot).

In the description, a "User Interface (UI) element" may refer to a graphic object displayed on a screen to receive an input from a user or to provide information to a user. The "UI element" also may refer to an object capable of interacting with a user and thus capable of giving a visual, an auditory and an olfactory feedback according to a user input.

In addition, the terms "application" or "App" in the exemplary embodiments refers to a set of computer programs designed to perform a specific function. There may be various applications in the exemplary embodiments. For example, the application may be a game application, a video play application, a map application, a memo application, a calendar application, a phone book application, a broadcast application, an exercise support application, a payment application, a photo folder application, a medical device control application, a user interface providing application of a plurality of medical devices, or the like but is not limited thereto.

Hereinafter, the present disclosure will be described in detail with reference to the accompanying drawings.

Figure 1:
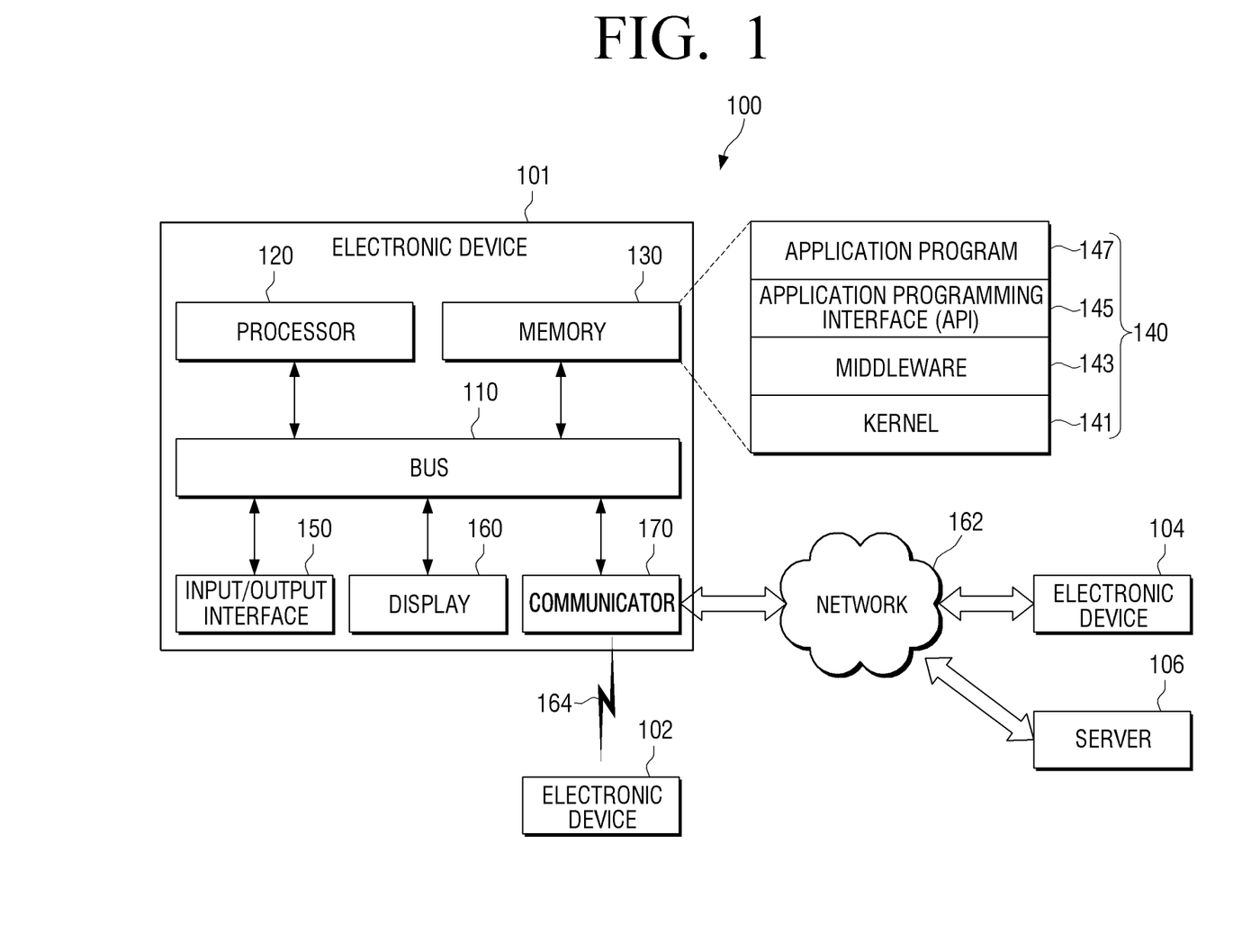
FIG. 1 is a view illustrating an electronic device in a network environment according to an exemplary embodiment.

FIG. 1 is a view illustrating an electronic device in a network environment 100 according to an exemplary embodiment.

Referring to FIG. 1, an electronic device 101 may include a bus 110, a processor 120, a memory 130, an input/output interface 150, a display 160, and a communicator 170. According to various exemplary embodiments, one or more elements may be omitted from the electronic device 101, and in other exemplary embodiments, one or more elements may be added. The bus 110 may connect elements 110 to 170 together and include a circuit transmitting a communication between the elements (e.g., control message or data). The processor 120 may include one or more of a central processing unit (CPU), application processor (AP) and communication processor (CP). The processor 120, for example, may perform an operation or data processing regarding control and/or communication of at least one of the other elements of the electronic device 101.

The memory 130 may include a volatile and/or nonvolatile memory. The memory 130, for example, may store a command or data regarding at least one of the other elements of the electronic device 101. According to an exemplary embodiment, the memory 130 may store software and/or a program 140. The program 140 may include, for example, a kernel 141, middleware 143, an application programming interface (API) 145, and/or an application program (or an "application") 147. At least some of the kernel 141, middleware 143, or API 145 may be referred to as an operation system. The kernel 141, for example, may control or manage system resources (e.g., the bus 110, the processor 120, or the memory 130, etc.) used to execute an operation or a function realized on the other programs (e.g., the middleware 143, the API 145, or the application program 147). In addition, the kernel 141 may provide an interface to control or manage the system resources by accessing individual elements of the electronic device 101 in the middleware 143, the API 145 or the application program 147.

The middleware 143, for example, may perform a relay operation so that the API 145 or the application program 147 may communicate with the kernel 141 to exchange data. In addition, the middleware 143 may process one or more job requests received from the application program 147 based on priorities. For example, the middleware 143 may give priority to use system resources (e.g., the bus 110, the processor 120, or the memory 130, etc.) of an electronic device 101 to at least one of application programs 147, and process the one or more job requests. The API 145 is an interface through which the application 147 controls the function that is provided from the kernel 141 or the middleware 143, and may include, for example, at least one interface or function (e.g., command) for file control, window control, image processing, or text control. The input/output interface 150, for example, may transmit a command or data input from a user or other external devices to another element(s) of the electronic apparatus 101, or output a command or data received from another element(s) of the electronic device 101 to a user or other external devices.

The display 160, for example, may include a liquid crystal display (LCD), a light-emitting diode (LED) display, an organic light-emitting diode (OLED) display, a microelectromechanical systems (MEMS) display, or an electronic paper display. The display 160, for example, may display a variety of contents (e.g., text, image, video, icon and/or symbol) to a user. The display 160 may include a touch screen, and may receive the inputs, for example, a touch, a gesture, a proximity indication or a hovering input using an electronic pen or a user's body part. The communicator 170, for example, may set a communication between an electronic device 101 and an external device (e.g., a first external electronic device 102, a second external electronic device 104, or a server 106). For example, the communicator 170 may be connected to the network 162 through wireless or wired communication to communicate with the external device (e.g., the second external electronic device 104, or a server 106).

The wireless communication, for example, may include a cellular communication using at least one among long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communications (GSM). According to an exemplary embodiment, a wireless communication, for example, may include at least one of wireless fidelity (WiFi), Bluetooth, Bluetooth low energy (BLE), Zigbee, near field communication (NFC), Magnetic Secure Transmission, radio frequency (RF), or Body Area Network (BAN). According to an exemplary embodiment, a wireless communication may include a global navigation satellite system (GNSS). The GNSS, for example, may be GPS (Global Positioning System), Glonass (Global Navigation Satellite System), Beidou Navigation Satellite System (hereinafter "Beidou") or Galileo, the European global satellite-based navigation system. Hereinafter, "GPS" may be used interchangeably with "GNSS". Wired communication may, for example, include at least one of universal serial bus (USB), high definition multimedia interface (HDMI), recommended standard-232 (RS-232), Power Line Communication, or plain old telephone service (POTS). The network 162 may include at least one of a telecommunication network, for example, a computer network (e.g., LAN or WAN), internet, or a telephone network.

The first and the second external electronic devices 102 and 104 may be a device which is the same as or different from the electronic device 101, respectively.

Figure 2:
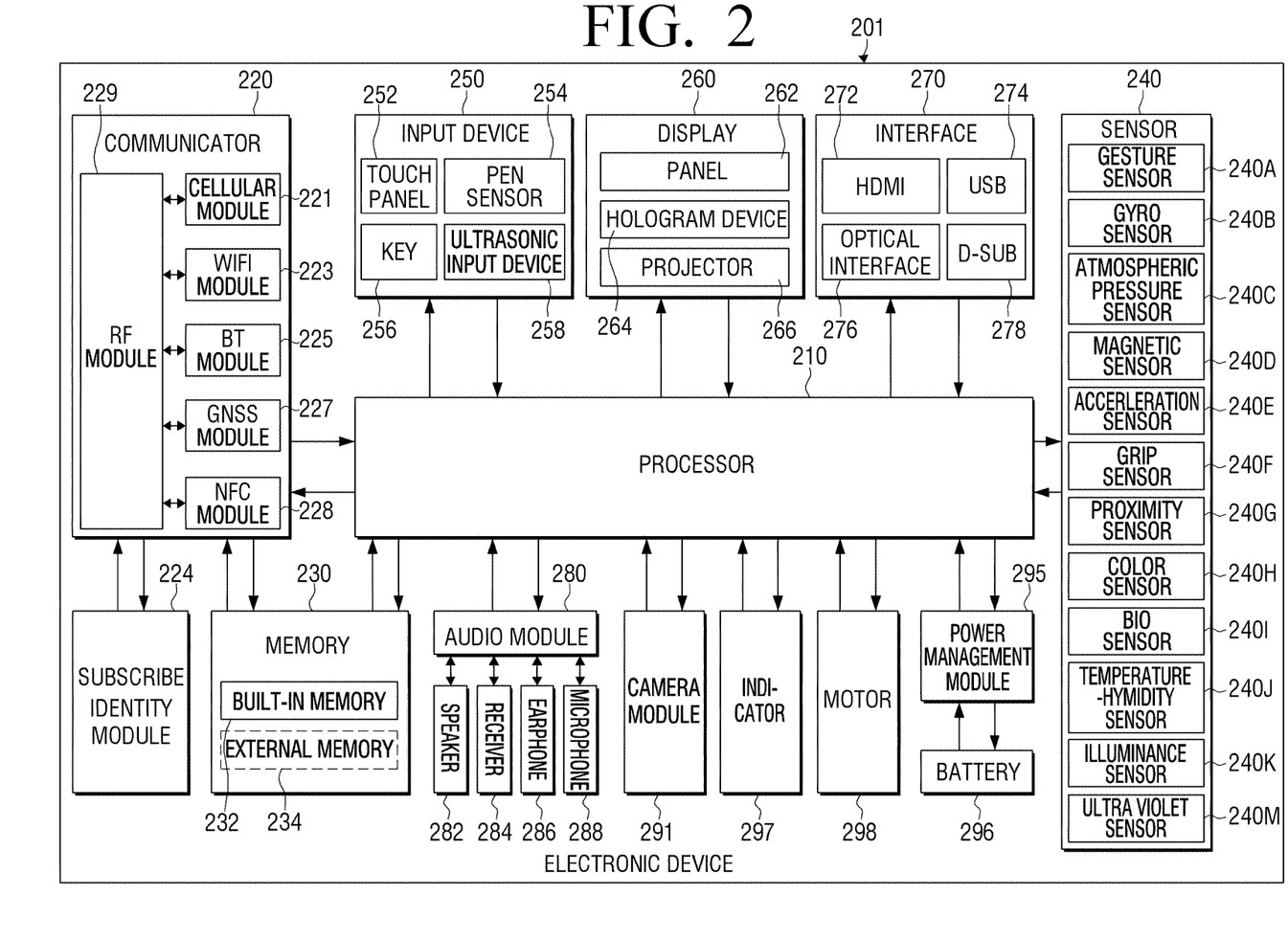
FIG. 2 is a block diagram illustrating an electronic device according to an exemplary embodiment.

FIG. 2 is a block diagram illustrating an electronic device 201 according to an exemplary embodiment. The electronic device 201, for example, may include all or part of the electronic device 101 illustrated in FIG. 1. The electronic device 201 may include more than one of a processor 210 (e.g., AP), a communicator 220, a subscribe identity module 224, a memory 230, a sensor module 240, an input device 250, a display 260, an interface 270, an audio module 280, a camera module 291, an electricity manage module 295, a battery 296, an indicator 297 and a motor 298. The processor 210, for example, may drive an operation system or an application program and control a large number of hardware or software elements connected to the processor 210, and perform all sorts of data processing and calculation. The processor 210, for example, may be realized as a system on chip (SoC). According to an exemplary embodiment, the processor 210 may further include a graphic processing unit (GPU) and/or an image signal processor. The processor 210 may include at least some among elements illustrated in FIG. 2 (e.g., cellular module 221). The processor 210 may load and process a command or data received from at least one of other elements (e.g., nonvolatile memory, such as a non-transitory computer readable storage) to a volatile memory, and store result data in the nonvolatile memory.

The communicator 220 (e.g., the communicator 170) may have an identical or similar composition. The communicator 220 may include, for example, the cellular module 221, WiFi module 223, Bluetooth module 225, GNSS module 227, NFC module 228 and RF module 229. The cellular module 221, for example, may provide a voice call, a video call, a text service, or internet service via a communication network. According to an exemplary embodiment, the cellular module 221 may perform a discrimination and an authentication for the electronic device 201 in a communication network by using a subscribe identity module 224 (e.g., SIM card). According to an exemplary embodiment, the cellular module 221 may perform at least some of the functions which can be provided by the processor 210. According to an exemplary embodiment, the cellular module 221 may include a communication processor (CP). According to an exemplary embodiment, at least some of (e.g., more than two) the cellular module 221, WiFi module 223, Bluetooth module 225, GNSS module 227 and NFC module 228 may be included in an integrated chip (IC) or an IC package. The RF module 229, for example, may send and receive a communication signal (e.g., RF signal). The RF module 229, for example, may include a transceiver, a power amp module (PAM), a frequency filer, a low noise amplifier (LNA), or an antenna and the like. According to an exemplary embodiment, at least one of the cellular module 221, WiFi module 223, Bluetooth module 225, GNSS module 227 and NFC module 228 may be send and receive the RF signal through a separate RF module. The subscribe identity module 224, for example, may include a card including a subscribe identity module or an embedded SIM, and unique identifying information (e.g., integrated circuit card identifier (IC-CID)) or subscribe information (e.g., international mobile subscriber identity (IMSI)).

The memory 230 (e.g., the memory 130), for example, may include a built-in memory 232 or an external memory 234. The built-in memory 232, for example, may include at least one of a volatile memory (e.g., DRAM, SRAM, or SDRAM, etc.) and a nonvolatile memory (e.g., one time programmable ROM (OTPROM), PROM, EPROM, EEPROM, mask ROM, flash ROM, flash memory, hard drive, or solid state drive (SSD)), such as a non-transitory computer readable storage. The external memory 234 may include a flash drive, for example, a compact flash (CF), a secure digital (SD), Micro-SD, Mini-SD, an extreme digital (XD), a multi-media card (MMC) or a memory stick and the like, such as a non-transitory computer readable storage. The external memory 234 may be connected functionally or physically to the electronic device 201 through a variety of interfaces.

The sensor module 240, for example, may measure physical quantity and sense the operation status of the electronic device 201, and may convert the measured or sensed information to an electrical signal. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G; a color sensor 240H (e.g., red, green, blue (RGB) sensor), a biosensor 240I, a temperature-humidity sensor 240J, an illuminance sensor 240K, and an ultra violet (UV) sensor 240M. Additionally or alternatively, the sensor module 240, for example, may include an e-nose sensor, an electromyographic (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit to control at least one or more sensors therein. According to an exemplary embodiment, the electronic device 201 may further include a processor configured to control the sensor module 240 in addition to or separately from the processor 210 so as to control the sensor module 240 while the processor 210 is in a sleep state.

The input device 250, for example, may include a touch panel 252, a (digital) pen sensor 254, a key 256 or an ultrasonic input device 258. The touch panel 252, for example, may use at least one among a capacitive method, a resistive method, an infrared method, and an ultrasonic method. In addition, the touch panel 252 may further include a control circuit. The touch panel 252 may further include a tactile layer and provide a tactile response to a user. The (digital) pen sensor 254, for example, may be part of a touch panel or include a separate detection sheet. The key 256, for example, may include a physical button, an optical key, or a keypad. The ultrasonic input device 258 may detect ultrasonic waves generated by an input tool, via a microphone (e.g., a microphone 288), and may check the data corresponding to the detected ultrasonic waves.

The display 260 (e.g., the display 160) may include the panel 262, the hologram device 264, or the projector 266 and/or a control circuit to control them. The panel 262, for example, may be flexible, transparent or wearable. The panel 262 may be configured as more than one module along with the touch panel 252. According to an exemplary embodiment, the panel 262 may include a pressure sensor (or a force sensor) which may measure a pressure intensity on a touch of a user. The pressure sensor may be integrated with the touch panel 252 or as more than one sensor separately from the touch panel 252. The hologram device 264 may show a stereoscopic image in the air using interference of light. The projector 266 may display an image by projecting light on a screen. The screen, for example, may be provided inside or outside the electronic device 201. The interface 270, for example, may include a high-definition multimedia interface (HDMI) 272, a universal serial bus (USB) 274, an optical interface 276, or a D-subminiature 278. The interface 270, for example, may be included in the communicator 170 illustrated in FIG. 1. Additionally or alternatively, the interface 270, for example, may include a mobile high-definition link (MHL) interface, a secure digital (SD) card/multi-media card (MMC) interface, or Infrared data association (IrDA) standard interface.

The audio module 280, for example, may convert sound and an electrical signal in bilateral directions. At least a part of the elements of the audio module 280, for example, may be included in the input/output interface 145 illustrated in FIG. 1. The audio module 280, for example, may process sound information input or output through a speaker 282, a receiver 284, an ear phone 286, or a microphone 288. A camera module 291, for example, is a device capable of capturing a stopped image and a moving image, and according to an exemplary embodiment, may include more than one image sensor (e.g., front sensor or a back sensor), a lens, an image signal processor (ISP), or a flash (e.g., LED or a xenon lamp, etc.). The power management module 295, for example, may manage the power of the electronic device 201. According to an exemplary embodiment, the power management module 295 may include a power management integrated circuit (PMIC), a charge integrated circuit (charger IC), battery or fuel gauge. The PMIC may have wired and/or wireless recharging method. A wireless charging method, for example, may include a magnetic resonance method, a self-induction method, or an electromagnetic wave method, and may further include an additional circuit for a wireless charging, for example, a coil loop, a resonant circuit, or a rectifier, etc. The battery gauge, for example, may measure remains of a battery 296, voltage when charging, a current, or temperature. The battery 296, for example, may include a rechargeable battery and/or a solar battery.

The indicator 297 may display a certain status of the electronic device 201 or a part of the electronic device 201 (e.g., the processor 210), for example, a booting status, a massage status, or a charging status, etc. The motor 298 may change an electric signal into a mechanical vibration, and generate a vibration, or a haptics effect, etc. The electronic device 201, for example, may include a device for supporting a mobile TV (e.g., GPU) capable of processing media data according to standards such as a digital multimedia broadcasting (DMB), digital video broadcasting (DVB), or mediaFlo™, etc. Each element described in the exemplary embodiment may consist of one or more than one component, and the name of the elements may vary depending on the type of electronic devices. The electronic device 201 may omit some constituent elements, may further include other additional constituent elements, or may be combined to form a single entity which performs the same functions as those elements before being combined.

A term used in the present disclosure "module" includes a unit consists of a hardware, a software or a firmware, and may be interchanged with the terms, for example, a logic, a logic block, an element, or a circuit, etc. The "module" may be also a minimum unit that is configured to perform one or more functions or a part thereof. The "module" may be implemented mechanically or electronically. For example, the module may include an application-specific integrated circuit chip (ASIC), field-programmable gate arrays (FPGAs) or a programmable-logic device which is known or will be developed for performance of operation.

At least some of a device according to various exemplary embodiments (e.g., modules or functions thereof) or methods (e.g., motions) may be realized as a command stored in a non-transitory computer readable storing medium (e.g., the memory 130) as a form of a program module. When the commands are performed by the processor (e.g., the processor 120), the processor may perform a corresponding function based on the commands. The computer readable storing medium may include a hard disc, a floppy disc, a magnetic medium (e.g., a magnetic tape), an optical medium (e.g., a compact disc read only memory (CD-ROM), a digital versatile disc (DVD)), a magneto-optical medium (e.g., a floptical disc), and a built-in memory, etc. An instruction may include a code that is made by a compiler and a code that is executed by using an interpreter. The module or a program module according to variety of embodiments may be configured by including at least one of the constituent elements described above, some of the constituent elements may be omitted, or other additional constituent element may be added. The module, a program module, or operations executed by other elements according to variety of embodiments may be executed consecutively, in parallel, repeatedly, or heuristically, or at least some operations may be executed according to a different order, may be omitted, or the other operation may be added thereto.

Figure 3:
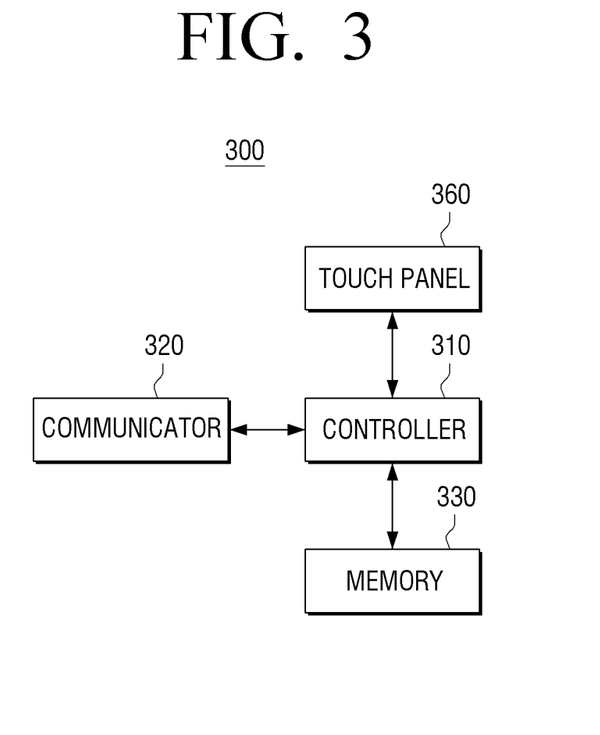
FIG. 3 is a block diagram illustrating an external device according to an exemplary embodiment.

FIG. 3 is a block diagram illustrating an external device according to an exemplary embodiment.

Referring to FIG. 3, the external device may include the controller 310, the communicator 320, the memory 330, and the touch panel 360.

The controller 310, the memory 330, and the touch panel 360 are the same as that explained in FIG. 2, and thus a detailed description thereof is omitted.

The communicator 320 may include Wifi module 223 and/or Bluetooth module 225. The communicator 320 may transmit touch information according to a user input detected in the touch panel 360 and the touch panel information of an external device to the electronic device by using the WiFi module and/or the Bluetooth module. The touch panel 360 information may include, for example, information regarding a physical size of the touch panel. The touch information may include coordinates of a touch point detected on the touch panel 360.

Figure 4:
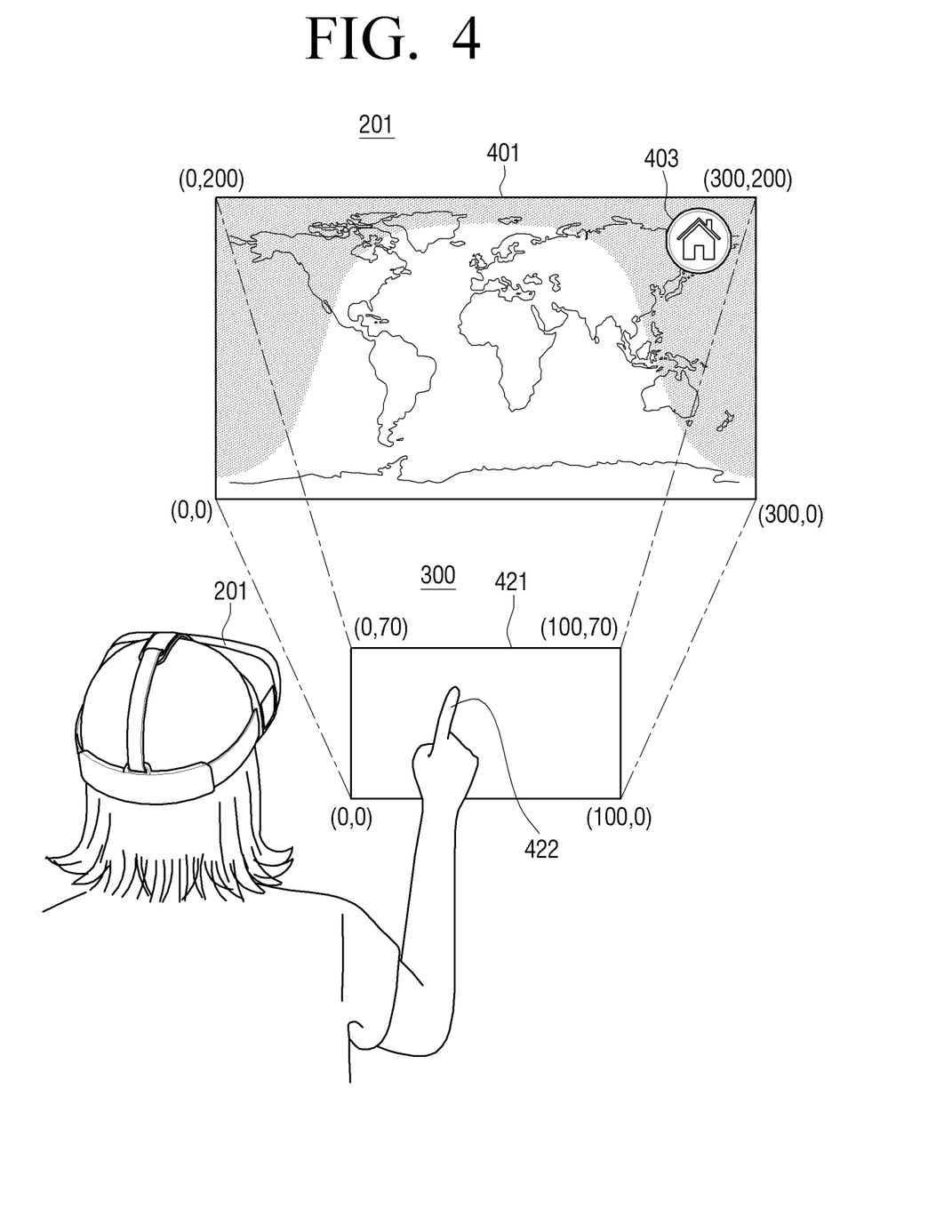
FIG. 4 is a view illustrating an electronic device and an external device according to an exemplary embodiment.

FIG. 4 is a view illustrating an electronic device and an external device according to an exemplary embodiment.

Figure 5:
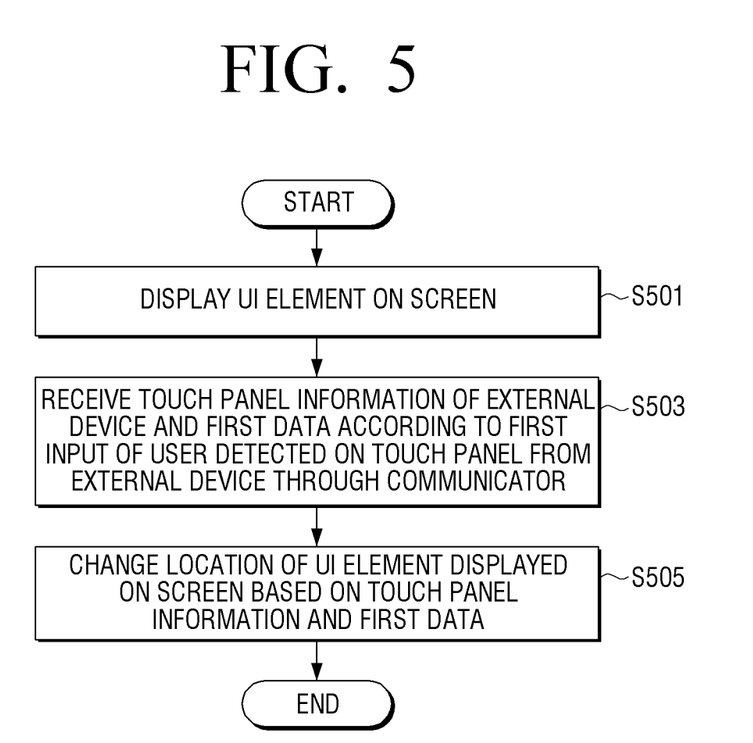
FIG. 5 is a flowchart illustrating a process of changing a touch area in an electronic device according to an exemplary embodiment.

FIG. 5 is a flowchart illustrating a process of adjusting a touch area in an electronic device according to an exemplary embodiment. Here, the touch area may refer to an area where a UI element that may react in response to a touch input of a user.

The electronic device may include a communicator which performs a communication with an external device, a display which displays a screen, and a processor. The processor may receive the touch panel information of the external device and the first data according to the first input of the user detected on the touch panel, and change the location of the UI element displayed on the screen based on the touch panel information and the first data. The first input may be a hovering input. The hovering input involves detecting a touch at the touch panel when a finger of a user is near the touch panel but does not touch directly the touch panel, as explained in FIG. 1. The first data may be coordinates of the point where the first input of a user is detected on the touch panel.

The processor may receive a second data according to a second input of a user detected on the touch panel, and select the UI element based on the second data. The second data may be received after the first data is received. That is, the first input is detected on the touch panel before the second input is detected, which may be called as a pre-touch. Hereinafter, the first input will be referred to as the pre-touch.

The processor may output the message inducing the adjustment of the touch location on the touch panel based on the touch panel information and the first data. The message may be output differently according to the coordinates of the first touch.

Referring to the following FIGS. 4 and 5, an exemplary embodiment in which the electronic device adjusts the touch area will be described.

FIG. 4 illustrates the electronic device 201, a display screen 401 of the electronic device (hereinafter, referred to as a 'screen'), and an external device 300. The electronic device 201 may be a head mounted electronic device which is mounted on a user's head. Alternatively, the electronic device 201 may be a device blocking a user's view. The external device 300 may be a table top computer which includes a touch panel, may be a smart phone, or a tablet.

The electronic device 201 may include a display and display (S501) a UI element 403 on the screen 401. Alternatively, the electronic device 201 may include content on the screen 401. The UI element 403 may be a graphic object providing for an interaction between a user and the electronic device 201. The user may select the UI element 403 displayed on the screen 401 and execute a function that the user wishes to execute, or enter into the other menu. In the case of a head mounted electronic device such as a Virtual Reality (VR) device, a user cannot touch a screen directly, and thus the user may have to select the corresponding UI element by using a separate external device connected to the electronic device through wire and wireless communication.

The electronic device 201 may receive the touch panel information of the external device 300 and the first data according to the first input of the user detected on the touch panel from the external device 300 through the communicator 220 (S503). The touch panel information may be information regarding a size of the touch panel. The first input may be a hovering detected on the external device according to that a user places a finger near the touch panel of the external device. That is, the first input may be the hovering. The first data may be coordinates of the point where the first input is detected on the touch panel. That is, the first data may be coordinates of the point where the hovering is detected.

The electronic device 201 may change a location of the UI element displayed on the screen of the electronic device 201 based on the touch panel information of the external device and the first data (S505).

The electronic device may receive the second data according to the second input of a user detected on the touch panel 421, and select the UI element based on the second data. The second data may be received after the first data is received.

If the electronic device 201 and the external device 300 are connected through a communication, the external device 300 may transmit information regarding a physical size of the touch panel 421 to the electronic device 201. For example, the external device transmits width '100' and height '70' as information of a touch panel. The electronic device 201 may receive size information of the touch panel from the external device 300, and correspond or correlate the size information on the display screen 401 of the electronic device 201. For example, if a resolution of the display screen 401 of the electronic device 201 has width of 300 and height of 200, the electronic device may match coordinates of the left bottom of the touch panel (0,0) and coordinates of the left bottom of the display screen 401 (0,0). The electronic device 201 may match coordinates of the right bottom of the touch panel (100,0) to coordinates of the right bottom of the display screen 401 (300,0). The electronic device 201 may match coordinates of the left top of the touch panel (0,70) to coordinates of the left top of the display screen 401 (0,200). The coordinates of the right top of the touch panel (100,70) is matched to the coordinates of the right top of the display screen 401 (300,200). If a user touches a point of the touch panel 421, the external device 300 may transmit coordinates of a point where the touch is detected to the electronic device 201, and the electronic device 201 may decide or determine the point on the display screen 401 which corresponds to the coordinates of the point where the touch is detected.

If a user pre-touches a finger on the touch panel 421 of the external device 300 to select the UI element 403 in the content displayed on the display screen 401, the external device 300 may detect that the finger of the user is near the touch panel (hereinafter, referred to as a hovering) and transmit coordinates of the touch panel 421 in which the hovering is detected to the electronic device 201. That is, the external device may transmit coordinates of the pre-touch location on the touch panel to the electronic device 201. The electronic device 201 may adjust and display a location of the UI element 403 on the screen 401 based on the received touch panel information and the coordinates of the pre-touch location (S505).

The pre-touch refers to that if a user places a finger near the touch panel 421, the touch panel 421 detects the hovering even though an actual physical touch does not occur.

The electronic device 201 may decide or determine a location on the display screen 401 corresponding to the first user input location, and display the UI element 403 on the corresponding location.

For example, if a user places a finger near a point (30,37) 422 of the touch panel 421 of the external device 300, the external device may transmit coordinates of the point (30, 37) and physical size information (100×70) of the touch panel to the electronic device 201. The electronic device 201 may display content and the UI element 403 on the display screen 401. The UI element 403 may be displayed on a preset location and coordinates thereof are (270, 190). The electronic device 201 may decide a location on the screen 401 corresponding to a pre-touch coordinates transmitted from the external device 300, and compare the above location and the location of the UI element 403. If the above location does not correspond with the location of the UI element 403 as a result of the comparison, the electronic device 201 may adjust the location of the UI element 403 to the above location and display the same.

Figure 6:
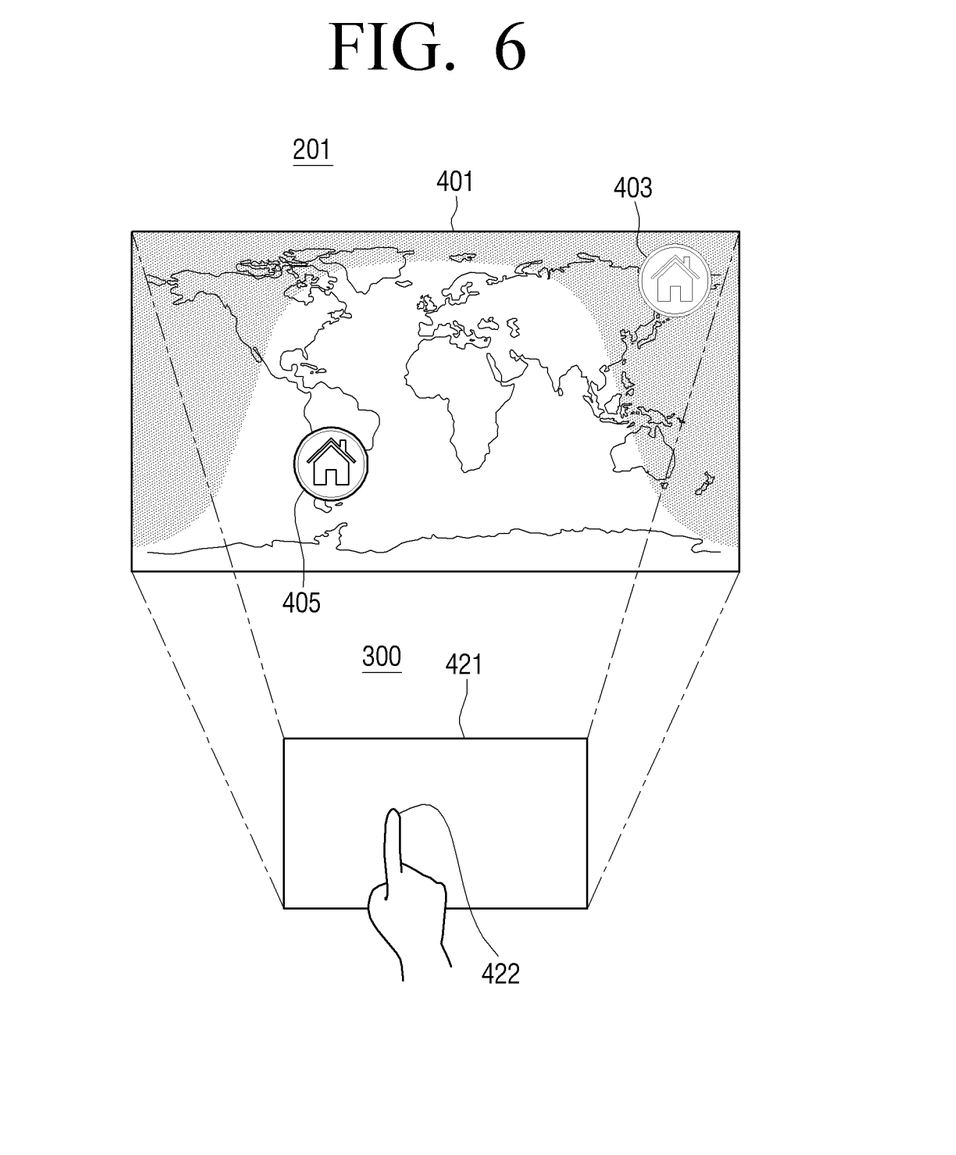
FIG. 6 is a view illustrating that an electronic device changes and displays a location of a UI element displayed on a screen according to a user's first input location detected on a touch panel of an external device according to an exemplary embodiment.

FIG. 6 is a view illustrating that an electronic device changes and displays a location of a UI element displayed on a screen according to a user's first input location detected on a touch panel of an external device according to an exemplary embodiment.

FIG. 6 illustrates the display screen 401 of the electronic device 201 and a touch panel 421 of the external device 300.

The electronic device 201 may be connected to the external device 300 through a wireless communication. For example, the electronic device 201 may be connected to the external device 300 through a pairing process of a Bluetooth communication. If the electronic device 201 is connected to the external device 300, data transmitted from the external device may be received at the electronic device 201. The electronic device 201 may control a function of the electronic device according to the data transmitted from the external device and control the UI element displayed on the screen.

For example, the electronic device 201 may receive size information of the touch panel 421 of the external device from the external device 300. If the external device 300 is paired with the electronic device 201, the external device 300 may transmit the size information of the touch panel, and after then, may transmit coordinates of a touch point detected on the touch panel 421 to the electronic device. Alternatively, the external device 300 may transmit information regarding touch gesture of a user detected on the touch panel to the electronic device 201.

The electronic device 201 may receive coordinates of a touch point detected on the touch panel 421 of the external device 300 from the external device, decide a location of the UI element 403 to be displayed on the screen 401 based on the received coordinates of the touch point, and display the UI element 403 on the screen.

For example, if the pre-touch 422 is detected on the touch panel 421 of the external device 300 while content is displayed on the screen 401 of the electronic device, the external device 300 may transmit coordinates of the pre-touch point to the electronic device 201. On the content, the UI element 403 may be displayed at the preset location.

The electronic device 201 may receive coordinates of the pre-touch 422 location and compare the touch location 405 on the screen 401 corresponding to the pre-touched location 422 to the display location 403 of the preset UI element. If the touch location 405 does not correspond with the UI element display location 403 as a result of the comparison, the electronic device 201 may adjust the UI element display location and display the UI element 405 on the adjusted location.

Figure 7:
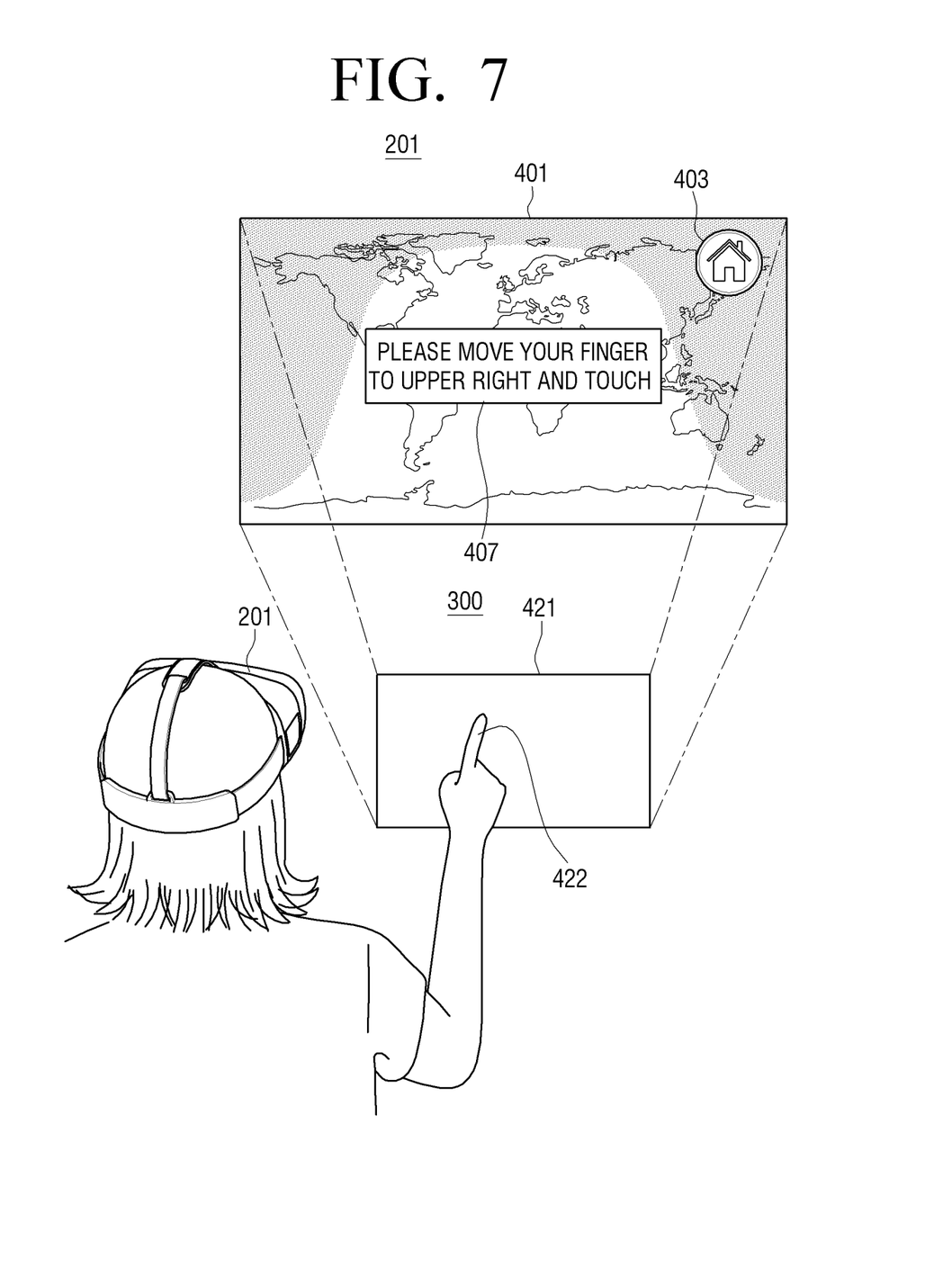
FIG. 7 is a view illustrating an example of displaying a message guiding a touch location on a screen of an electronic device according to an exemplary embodiment.

FIG. 7 is a view illustrating an example of displaying a message guiding a touch location on a screen 401 of an electronic device 201 according to an exemplary embodiment.

FIG. 7 illustrates the electronic device 201, screen 401 of the electronic device, and the external device 300. The external device 300 may include the touch panel 421. If the electronic device 201 and the external device 300 are connected wirelessly, the external device 300 may transmit size information regarding the touch panel 421 to the electronic device 201. The external device 300 may detect the pre-touch 422 of a user on the touch panel 421 and transmit coordinates of the pre-touch location to the electronic device 201.

The electronic device 201 may output the message 407 inducing an adjustment of the touch location on the touch panel 421 based on the touch panel information and the first data. Multiple messages may be provided, and the messages may be output differently according to the coordinates of the first touch. The message may be output on the screen. The message may be output as a voice. Specific examples of outputting the message as a voice will be described below by referring to FIG. 8.

Specifically, the electronic device 201 may receive information regarding the touch panel 421 and coordinates of the pre-touch location from the external device 300, and decide a location on the screen 401 corresponding to the touch location on the touch panel 421 referring to the received size information of the touch panel.

The electronic device 201 may compare the pre-touch location on the screen 401 to the location where the UI element 403 is displayed, and if the location does not correspond to each other, the electronic device 201 may display the message 407 on the screen. The number of the message 407 may be plural according to the pre-touch location and the electronic device may select an appropriate message among the plurality of messages according to the pre-touch location and the location of the UI element 403 on the screen 401.

For example, if the location of the pre-touch is located on a left bottom of the UI element 403 display location on the screen 401 corresponding to the pre-touch location 422 of a user on the touch panel 421, the electronic device may output a message such as "please move your finger to the upper right and touch".

If the location of the pre-touch is located on a left top of the UI element 403 display location on the screen 401 corresponding to the pre-touch location 422 of a user on the touch panel 421, the electronic device may output a message such as "please move your finger to right and down side and touch".

Figure 8:
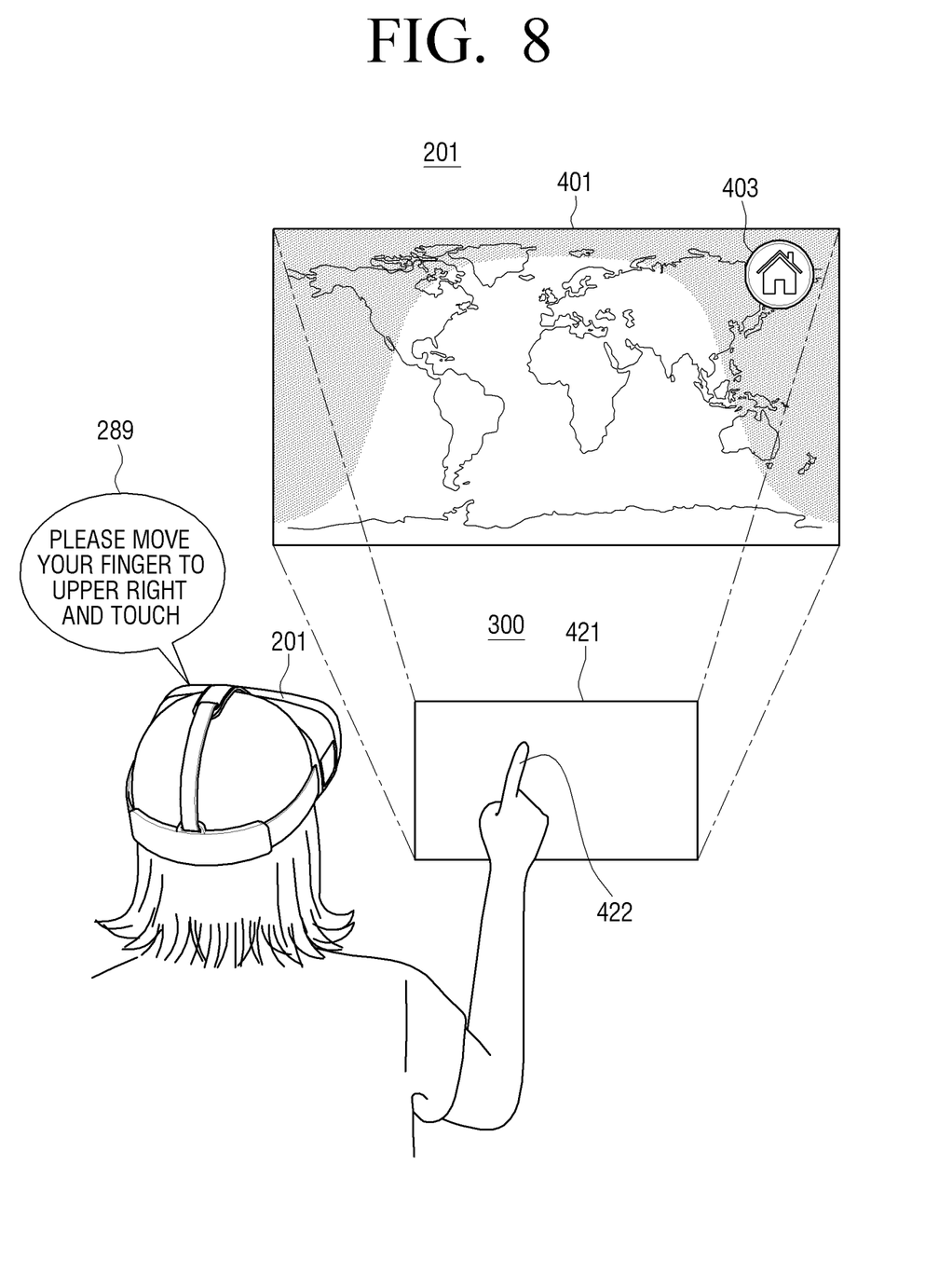
FIG. 8 is a view illustrating an example of outputting a message guiding a touch location on an electronic device as a voice according to an exemplary embodiment.

FIG. 8 is a view illustrating an example of outputting a message guiding a touch location on an electronic device as a voice according to an exemplary embodiment.

FIG. 8 illustrates the electronic device 201, screen 401 of the electronic device, and the external device 300. The external device 300 may include the touch panel 421. If the electronic device 201 is connected to the external device 300 wirelessly, the electronic device 201 may output a message inducing an adjustment of the touch input location on the touch panel based on the touch panel 421 information and coordinates of the pre-touch location as a voice.

A process outputting a message guiding a touch location based on size information of the touch panel 421 and coordinates of the pre-touch location is the same as that explained in FIG. 7, and thus specific descriptions thereof are omitted.

For example, if the location of the pre-touch is located on a left bottom of the UI element 403 display location on the screen 401 corresponding to the pre-touch location 422 of a user on the touch panel 421, the electronic device may output a message 289 such as "please move your finger to the upper right and touch".

If the location of the pre-touch is located on a left top of the UI element 403 display location on the screen 401 corresponding to the pre-touch location 422 of a user on the touch panel 421, the electronic device may output a message such as "please move your finger to right and down side and touch".

Figure 9:
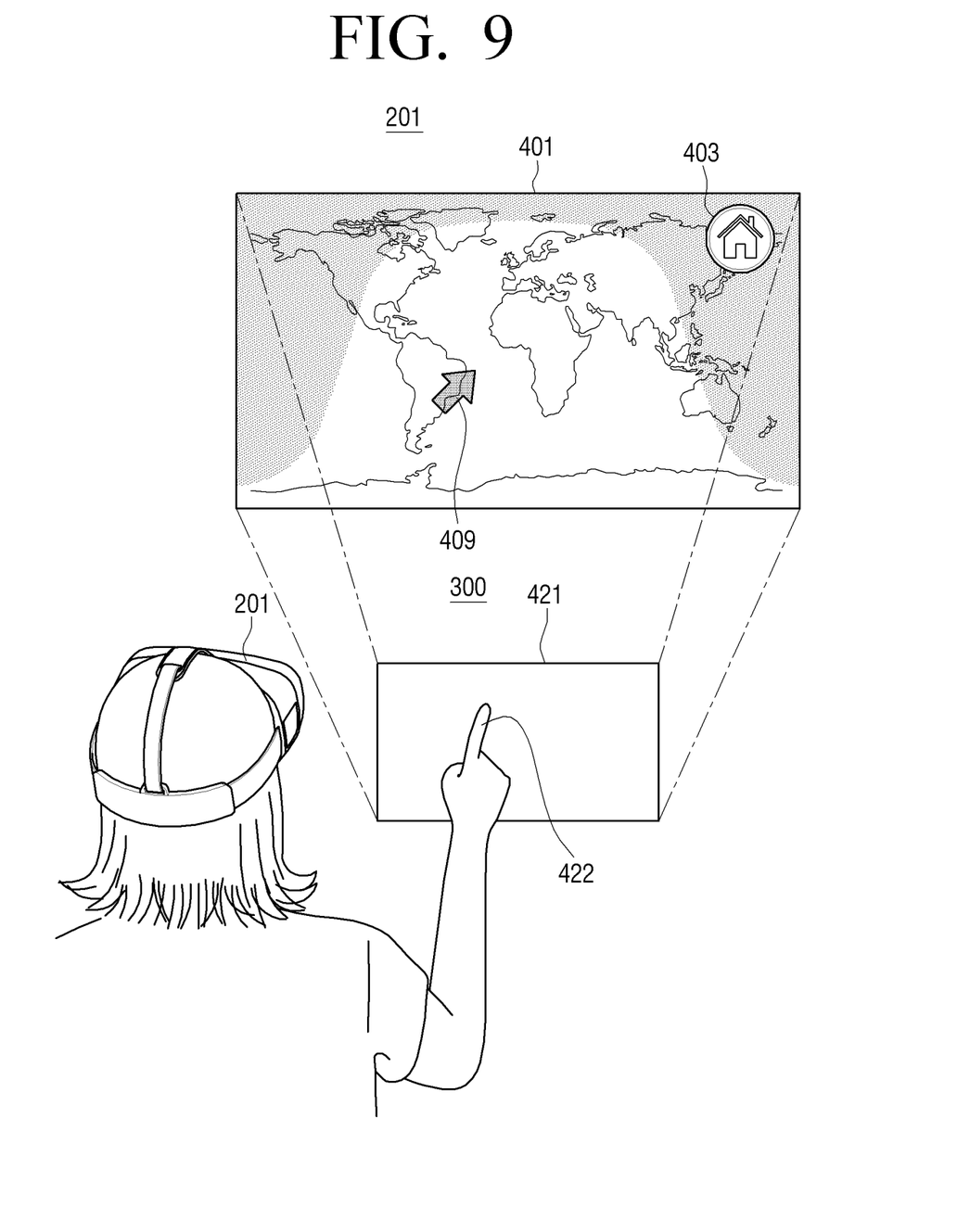
FIG. 9 is a view illustrating an example of displaying a graphic object guiding a touch location on a screen of an electronic device according to an exemplary embodiment.

FIG. 9 is a view illustrating an example of displaying a graphic object guiding a touch location on a screen of an electronic device according to an exemplary embodiment.

The electronic device may output a graphic object inducing the adjustment of the touch input location on the touch panel based on the touch panel information and the first data.

FIG. 9 illustrates the electronic device 201, screen 401 of the electronic device, and the external device 300. The external device 300 may include the touch panel 421. If the electronic device 201 is connected to the external device 300 wirelessly, the electronic device 201 may display the graphic object 409 inducing an adjustment the touch location on the touch panel based on the touch panel 421 information and coordinates of the pre-touch location on the screen 401. The graphic object may be, for example, an "arrow 409". A direction of the "arrow 409" may indicate a direction where a hand of a user has to move toward, and a length of the "arrow 409" may indicate a moving distance that the hand of a user has to move.

A process that the electronic device 201 outputs a graphic object guiding a touch location based on a size information of the touch panel 421 and coordinates of the pre-touch location is the same as that explained in FIG. 7, and thus specific descriptions thereof are omitted.

For example, if the location of the pre-touch 422 on the touch panel 421 is located on a left bottom of the UI element 403 display location on the screen 401, the electronic device may display the arrow pointing right and upper side on the screen.

Figure 10:
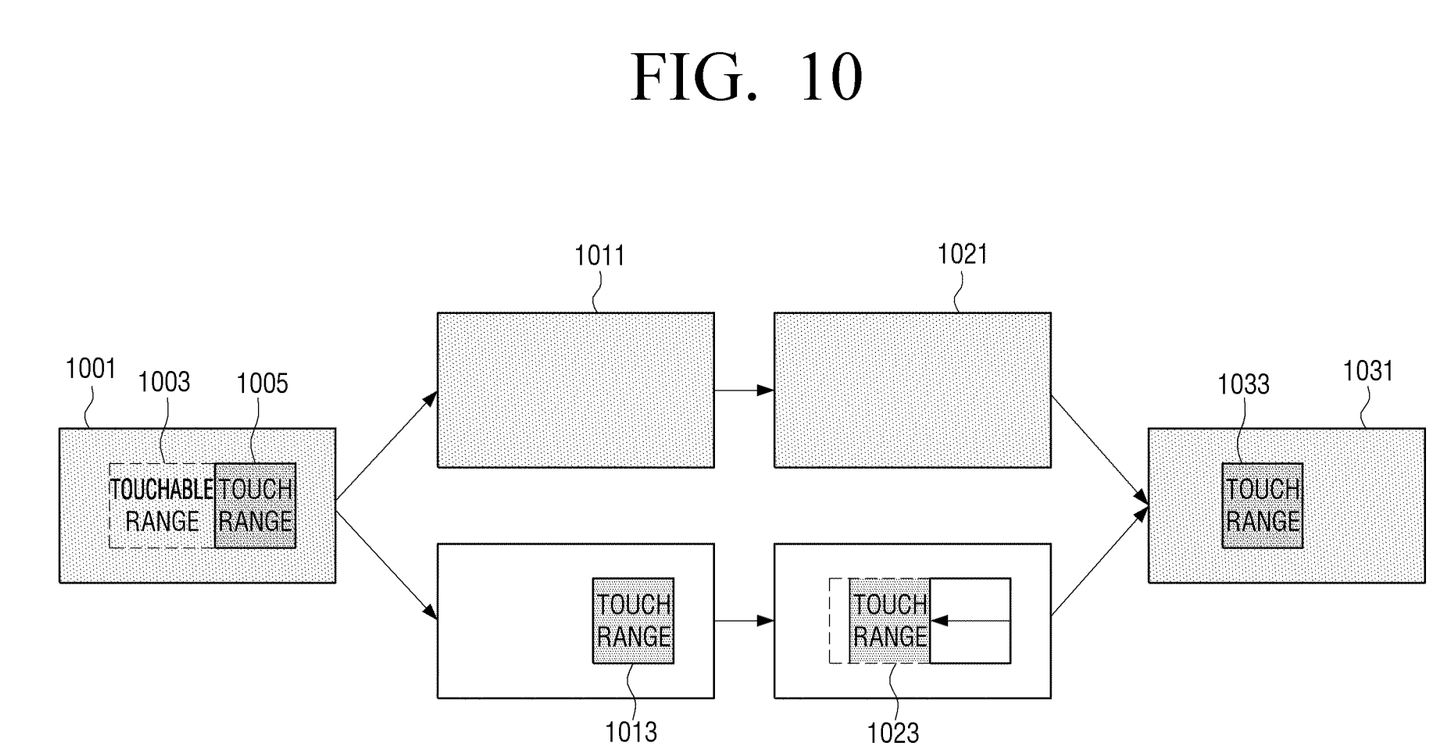
FIG. 10 is a view illustrating a process of changing a touch area on an electronic device according to an exemplary embodiment.

FIG. 10 is a view illustrating a process of changing a touch area on an electronic device according to an exemplary embodiment.

FIG. 10 illustrates a touchable range 1003 and a touch range 1005 on the screen 1001 of the electronic device. The touchable range 1003 is a touch area on the screen 1005 corresponding to an area where an actual touch input occurs on the touch panel of the external input device, and the touch range 1005 is a touch area preset on the screen 1001.

If a user touches the touch range 1005 while looking at the screen 1001 of the electronic device, an actual touch area of the user on the external device may be a touchable range 1003 of the screen 1001. The electronic device may divide an image frame including the screen 1001 into the touch range 1013 and a non touch range.

The electronic device may decide a touchable range of the touch range 1013 of the screen based on an actual touch range on the touch panel received from an external device, and move the touch range 1023 to the touchable range.

The electronic device may merge an image frame regarding the touch range 1033 which is moved to the touchable range and an image frame regarding the non touch range and generate one image frame, and display the image frame on the screen 1031.

What is claimed is:

1. An electronic device, comprising:
   a communicator;
   a display; and
   a processor configured to:
      in response to pairing with an external device, receive touch panel information comprising information on a size of a touch panel of the external device through the communicator,
      display a UI (User Interface) element on a first location of a screen of the display;
      receive, through the communicator, data including information on coordinates of a user input detected by the touch panel of the external device, identify a second location of the screen corresponding to the coordinates of the user input based on correlation of the size of the touch panel to a size of the screen and the data including information on the coordinates of the user input detected by the touch panel of the external device, and move the UI element displayed on the first location to the identified second location.

2. The electronic device as claimed in claim 1, wherein the user input comprises a hovering input.

3. The electronic device as claimed in claim 2, wherein the data comprises coordinates of a hovering point of the hovering input.

4. The electronic device as claimed in claim 1,
wherein the data is a first data and the user input is a first input, and the processor receives a second data according to a second input of the user input detected on the touch panel of the external device, and selects the UI element displayed on the screen of the electronic device based on the second data.

5. The electronic device as claimed in claim 4, wherein the second data is received after the first data is received.

6. The electronic device as claimed in claim 1, wherein the processor outputs a message inducing change of a touch location on the touch panel based on the touch panel information and the data including the information on the detected location on the user input detected by touch panel of the external device.

7. The electronic device as claimed in claim 6, wherein the message is output differently according to coordinates of the user input.

8. The electronic device as claimed in claim 6, wherein the message is output as a voice message.

9. The electronic device as claimed in claim 6, wherein the message is displayed on the screen.

10. The electronic device as claimed in claim 1, wherein the processor outputs a graphic object inducing change of a touch location on the touch panel based on the touch panel information and the data including information on the detected location of the user input detected by the touch panel of the external device.

11. A screen display method of an electronic device, the method comprising:
in response to pairing with an external device, receiving touch panel information comprising information on a size of a touch panel of the external device;

displaying a UI (User Interface) element on a first location of a screen;

receiving data including information on coordinates of a user input detected by the touch panel of the external device;

identifying a second location of the screen corresponding to the coordinates of the user input based on correlation of the size of the touch panel to a size of the screen and the data including information on the coordinates of the user input detected by the touch panel of the external device; and moving the UI element displayed on the first location to the identified second location.

12. The screen display method as claimed in claim 11, wherein the user input comprises a hovering input.

13. The screen display method as claimed in claim 12, wherein the data comprises coordinates of a hovering point of the hovering input.

14. The screen display method as claimed in claim 11, wherein the data is a first data and the user input is a first input, and the method further comprises:
receiving a second data according to a second input of the user input detected on the touch panel; and selecting the UI element displayed on the screen of the electronic device based on the second data.

15. The screen display method as claimed in claim 14, wherein the second data is received after the first data is received.

16. The screen display method as claimed in claim 11 comprising:
outputting a message inducing change of a touch location on the touch panel based on the touch panel information and the data including the information on the location of the user input detected by the touch panel of the external device.

17. The screen display method as claimed in claim 16, wherein the message is output differently according to coordinates of the user input.

18. The screen display method as claimed in claim 16, wherein the message is output as a voice message.

19. The screen display method as claimed in claim 16, wherein the message is displayed on the screen.

* * * * *